(12) United States Patent
Takeuchi

(10) Patent No.: US 12,233,924 B2
(45) Date of Patent: Feb. 25, 2025

(54) DETERIORATION DIAGNOSIS APPARATUS, DETERIORATION DIAGNOSIS SYSTEM, AND DETERIORATION DIAGNOSIS METHOD

(71) Applicant: Mitsubishi Electric Corporation, Tokyo (JP)

(72) Inventor: Takeshi Takeuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 477 days.

(21) Appl. No.: 17/596,519

(22) PCT Filed: Jun. 27, 2019

(86) PCT No.: PCT/JP2019/025748
§ 371 (c)(1),
(2) Date: Dec. 13, 2021

(87) PCT Pub. No.: WO2020/261522
PCT Pub. Date: Dec. 30, 2020

(65) Prior Publication Data
US 2022/0234635 A1    Jul. 28, 2022

(51) Int. Cl.
*B61L 27/57*     (2022.01)
*B61L 27/04*     (2006.01)

(52) U.S. Cl.
CPC .............. *B61L 27/57* (2022.01); *B61L 27/04* (2013.01)

(58) Field of Classification Search
CPC ................................. B61L 27/57; B61L 27/04
See application file for complete search history.

(56) References Cited

U.S. PATENT DOCUMENTS 9,809,235 B2 * 11/2017 Jung ..................... B61L 27/04
11,208,129 B2 * 12/2021 Kumar ................. G05D 1/0094
(Continued)

FOREIGN PATENT DOCUMENTS

CN     206307038 U    7/2017
JP     2018137967 A   8/2018
(Continued)

OTHER PUBLICATIONS

International Search Report (PCT/ISA/210) with English translation and Written Opinion (PCT/ISA/237) mailed on Sep. 17, 2019, by the Japan Patent Office as the International Searching Authority for International Application No. PCT/JP2019/025748.
(Continued)

*Primary Examiner* — Luis A Martinez Borrero
(74) *Attorney, Agent, or Firm* — BUCHANAN, INGERSOLL & ROONEY PC

(57) ABSTRACT

A deterioration diagnosis apparatus includes: a measurement condition storage unit in which first measurement conditions under which measurement is performed for diagnosing a state of a device installed on a train are stored; a measurement condition determination unit determining whether or not the first measurement conditions meet second measurement conditions in operation data that has been acquired from the train and includes a measurement result indicating the state of the device, the second measurement conditions being conditions under which the measurement result has been obtained; a difference condition extraction unit extracting a difference between the first measurement conditions and the second measurement conditions when it is determined that there is inconsistency between the first measurement conditions and the second measurement conditions; a control command generation unit generating a control command for eliminating the difference; and a control command
(Continued)

transmission unit transmitting the control command to the train.

9 Claims, 10 Drawing Sheets

(56) References Cited

U.S. PATENT DOCUMENTS

| | | | | |
|---|---|---|---|---|
| 11,691,657 | B2* | 7/2023 | Staats | B61L 29/28 |
| | | | | 246/122 R |
| 2010/0100275 | A1* | 4/2010 | Mian | G01M 17/08 |
| | | | | 382/284 |
| 2016/0075357 | A1* | 3/2016 | Jung | B61L 25/025 |
| | | | | 701/20 |
| 2016/0123840 | A1* | 5/2016 | Takada | G05B 15/02 |
| | | | | 702/39 |
| 2018/0257683 | A1* | 9/2018 | Govindappa | B61L 27/57 |
| 2019/0126949 | A1 | 5/2019 | Tashiro et al. | |
| 2019/0176862 | A1* | 6/2019 | Kumar | B61L 25/025 |
| 2021/0138873 | A1* | 5/2021 | Tsujimura | G06F 11/3013 |
| 2022/0063689 | A1* | 3/2022 | Kumar | H04N 23/65 |
| 2023/0359192 | A1* | 11/2023 | Iwanaga | G05B 23/0221 |
| 2023/0373457 | A1* | 11/2023 | Snyder | B60T 17/221 |

FOREIGN PATENT DOCUMENTS

| | | |
|---|---|---|
| KR | 20120074929 A | 7/2012 |
| WO | 2017212629 A1 | 12/2017 |

OTHER PUBLICATIONS

Office Action dated Jul. 21, 2022, issued in corresponding Indian Patent Application No. 202127052667, 6 pages.

\* cited by examiner

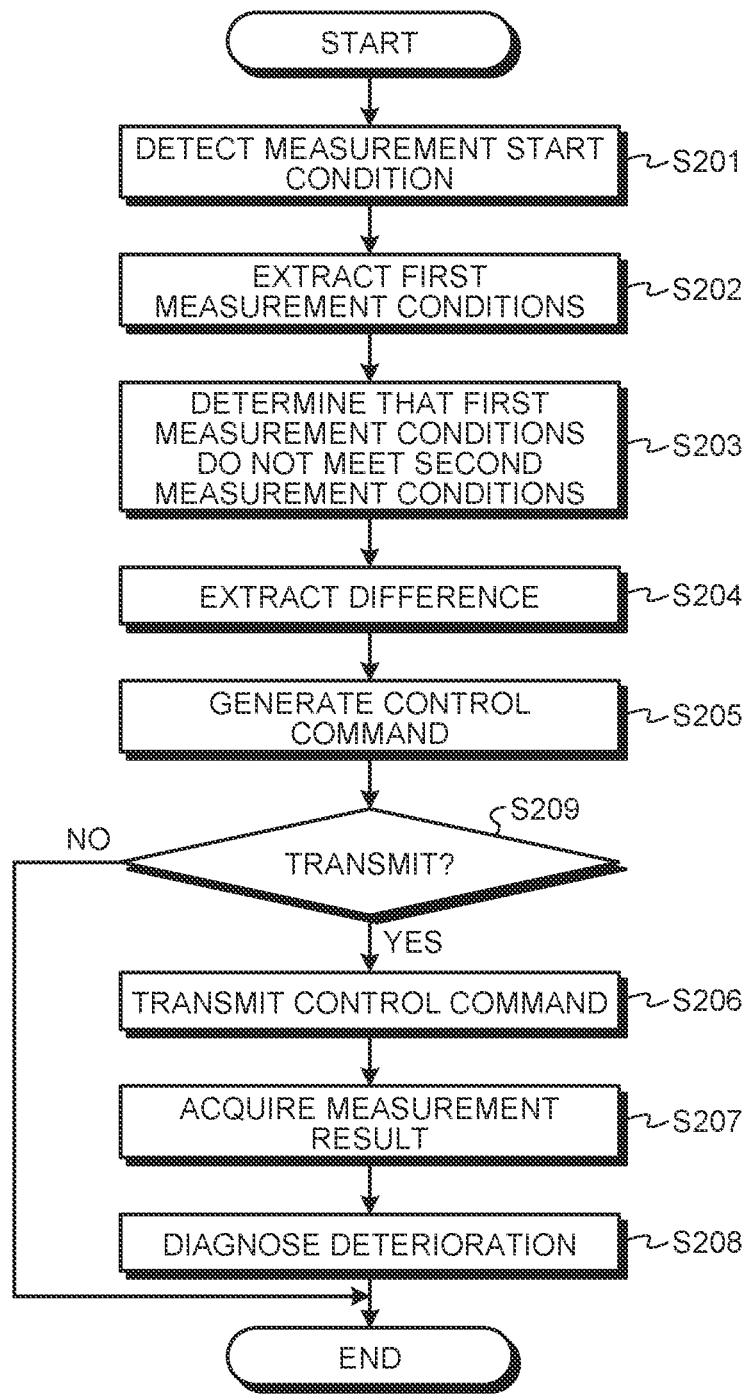

DETERIORATION DIAGNOSIS APPARATUS, DETERIORATION DIAGNOSIS SYSTEM, AND DETERIORATION DIAGNOSIS METHOD

FIELD

The present invention relates to a deterioration diagnosis apparatus, a deterioration diagnosis system, and a deterioration diagnosis method for diagnosing deterioration of a device installed on a train.

BACKGROUND

Conventionally, a device installed on a train is periodically inspected so as to prevent failure of the device during operation of the train. However, a train is actually equipped with a lot of devices, so that it takes much time to inspect these devices. In addition, as the number of trains increases, it also takes more time to make inspection from these trains. In order to address such a 20 problem, Patent Literature 1 discloses a technique for reducing the time for inspecting a train by using data obtained when the state of a device is monitored during operation of a railroad car. In the technique disclosed in Patent Literature 1, it is possible to diagnose 25 deterioration of a device by extracting and comparing the state of the device operating under the same condition, instead of performing periodic inspection.

CITATION LIST

30 Patent Literature
Patent Literature 1: Japanese Patent Application Laid-open No. 2018-137967

SUMMARY

Technical Problem

Patent Literature 1 specifically describes a compressor as an example. However, it is difficult for some devices, such as an air conditioner installed on a train, to operate under the same condition due to things like a season, a weather, and so on. For this reason, there has been a problem that data during an operation under the same condition, that is, data for deterioration diagnosis may be unable to be acquired depending on a device installed on a train.

The present invention has been made in view of the above circumstances, and an object of the present invention is to provide a deterioration diagnosis apparatus capable of acquiring data indicating the states of a device under the same measurement condition when a train is operated.

Solution to Problem

In order to solve the above-mentioned problems and achieve the object, the present invention provides a deterioration diagnosis apparatus comprising: a measurement condition storage unit in which first measurement conditions are stored, the first measurement conditions being conditions under which measurement is performed for diagnosing a state of a device installed on a train; a measurement condition determination unit to determine whether or not the first measurement conditions meet second measurement conditions in operation data that has been acquired from the train and includes a measurement result indicating the state of the device, the second measurement conditions being conditions under which the measurement result has been obtained; a difference condition extraction unit to extract a difference between the first measurement conditions and the second measurement conditions when the measurement condition determination unit determines that there is inconsistency between the first measurement conditions and the second measurement conditions; a control command generation unit to generate a control command for eliminating the difference; and a control command transmission unit to transmit the control command to the train.

Advantageous Effects of Invention

According to the present invention, a deterioration diagnosis apparatus has an advantageous effect that it can acquire data indicating the states of a device under the same measurement condition when a train is operated.

BRIEF DESCRIPTION OF DRAWINGS

FIG. 11 is a flowchart illustrating an operation of the deterioration diagnosis apparatus according to the second embodiment.

DESCRIPTION OF EMBODIMENTS

Hereinafter, a deterioration diagnosis apparatus, a deterioration diagnosis system, and a deterioration diagnosis method according to embodiments of the present invention will be described in detail with reference to the drawings. Note that the present invention is not necessarily limited by these embodiments.

First Embodiment

Figure 1:
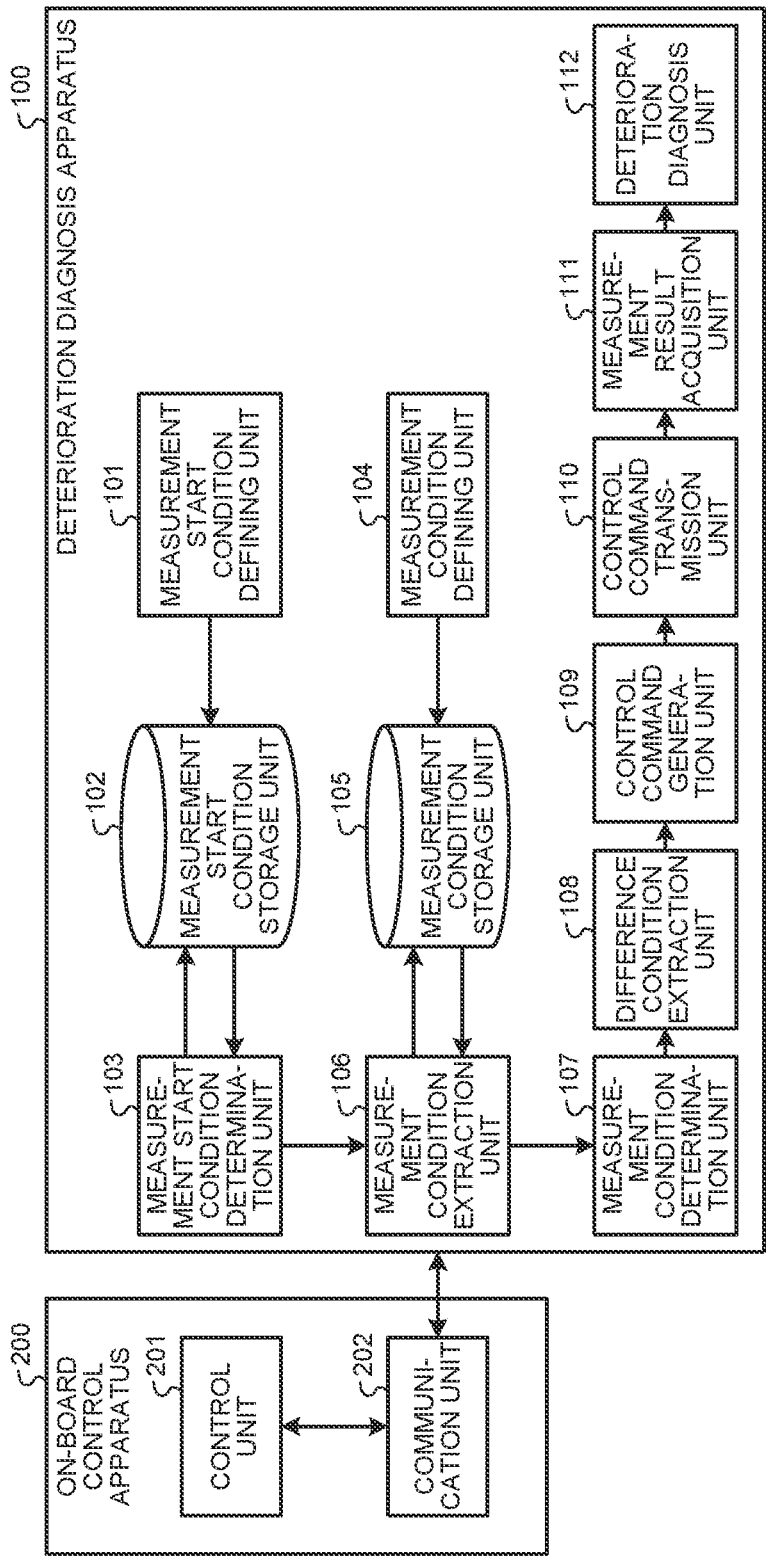
FIG. 1 is a block diagram showing a configuration example of a deterioration diagnosis system according to a first embodiment.

FIG. 1 is a block diagram showing a configuration example of a deterioration diagnosis system 300 according to a first embodiment of the present invention. The deterioration diagnosis system 300 includes a deterioration diagnosis apparatus 100 and an on-board control apparatus 200. The deterioration diagnosis apparatus 100 serves as a ground system that is installed on the ground and diagnoses the states of devices installed on a train (not illustrated), that is, deterioration of the devices. The deterioration diagnosis apparatus 100 is, for example, a remote maintenance support system. Examples of the devices installed on the train include, but are not limited to, an air conditioner, a brake, and a variable voltage variable frequency (VVVF). The on-board control apparatus 200 serve as an on-board system that is installed on the train (not illustrated) and monitors the states of the devices installed on the train (not illustrated). The on-board control apparatus 200 is, for example, a train integrated management system. The on-board control apparatus 200 monitors the state of each device installed on the train after energization of the train, that is, when operation of the train is started. The on-board control apparatus 200 transmits, to the deterioration diagnosis apparatus 100, operation data including a result of monitoring the state of each device, that is, a measurement result indicating the state of each device. Once operation of the train is started, the deterioration diagnosis apparatus 100 acquires the operation data from the on-board control apparatus 200 during the operation of the train.

A configuration of the deterioration diagnosis apparatus 100 will be described. The deterioration diagnosis apparatus 100 includes a measurement start condition defining unit 101, a measurement start condition storage unit 102, a measurement start condition determination unit 103, a measurement condition defining unit 104, a measurement condition storage unit 105, a measurement condition extraction unit 106, a measurement condition determination unit 107, a difference condition extraction unit 108, a control command generation unit 109, a control command transmission unit 110, a measurement result acquisition unit 111, and a deterioration diagnosis unit 112.

The measurement start condition defining unit 101 receives an operation from a user, and thereupon defines a measurement start condition using acquisition of operation data from the on-board control apparatus 200 as a trigger. The measurement start condition is a condition for starting measurement for diagnosing the state of a device installed on the train. Examples of the measurement start condition include, but are not limited to, a case where the power to a car is turned on when operation of the train (not illustrated) is started and a case where a flag indicating a failure of a specific device is detected.

The measurement start condition storage unit 102 stores one or more measurement start conditions defined by the measurement start condition defining unit 101.

The measurement start condition determination unit 103 lists the measurement start conditions stored in the measurement start condition storage unit 102, and monitors whether or not there is a relevant measurement start condition for each piece of operation data of the device. Specifically, the measurement start condition determination unit 103 determines whether or not a measurement start condition has been detected in the operation data acquired from the on-board control apparatus 200 installed on the train, the operation data including a measurement result indicating the state of the device. The operation data shall include, in addition to the measurement result, information indicating that the power to the car has been turned on, a flag indicating a failure of a particular device, and the like.

The measurement condition defining unit 104 receives an operation from the user, and defines a measurement condition under which measurement is performed for diagnosing deterioration of the device, the measurement condition being associated with the measurement start condition described above. The measurement condition defined by the measurement condition defining unit 104 may be referred to as a first measurement condition.

The measurement condition storage unit 105 stores one or more first measurement conditions defined by the measurement condition defining unit 104.

When one or more satisfied measurement start conditions are detected in the measurement start condition determination unit 103, the measurement condition extraction unit 106 extracts one or more first measurement conditions associated with the detected measurement start conditions from the measurement condition storage unit 105.

The measurement condition determination unit 107 determines whether or not the first measurement condition extracted by the measurement condition extraction unit 106 meet a second measurement condition which is included in the operation data and used when the measurement result has been obtained. The second measurement condition is a condition under which the on-board control apparatus 200 has monitored the device in the train, that is, a measurement condition under which the state of the device has been determined.

In a case where the measurement condition determination unit 107 determines that the first measurement conditions do not meet the second measurement conditions, the difference condition extraction unit 108 extracts a difference between the first measurement conditions and the second measurement conditions in that case.

The control command generation unit 109 generates a control command for eliminating the difference extracted by the difference condition extraction unit 108.

The control command transmission unit 110 transmits the control command generated by the control command generation unit 109 to the on-board control apparatus 200 installed on the train.

The measurement result acquisition unit 111 acquires, from the on-board control apparatus 200, operation data including a measurement result obtained under the second measurement conditions identical to the first measurement conditions on the basis of the control command transmitted by the control command transmission unit 110. The measurement result acquisition unit 111 may directly acquire the measurement result obtained under the second measurement conditions identical to the first measurement conditions from a communication unit 202 of the on-board control apparatus 200, or may acquire the measurement result via the measurement start condition determination unit 103, the measurement condition extraction unit 106, the measurement condition determination unit 107, the difference condition extraction unit 108, the control command generation unit 109, and the control command transmission unit 110.

When the second measurement conditions meet the first measurement conditions, the deterioration diagnosis unit 112 makes a diagnosis based on a state of whether or not the device installed on the train has deteriorated, with use of the measurement result included in the operation data.

A configuration of the on-board control apparatus 200 will be described. The on-board control apparatus 200 includes a control unit 201 and the communication unit 202.

The control unit 201 monitors the state of a device installed on the train (not illustrated), and generates operation data including a measurement result indicating the state of the device. In addition, when acquiring, from the deterioration diagnosis apparatus 100, a control command for eliminating the difference extracted by the difference condition extraction unit 108, the control unit 201 performs control so as to change a relevant measurement condition.

The communication unit 202 transmits the operation data generated by the control unit 201 to the deterioration diagnosis apparatus 100. In addition, the communication unit 202 outputs, to the control unit 201, the control command acquired from the deterioration diagnosis apparatus 100.

Figure 2:
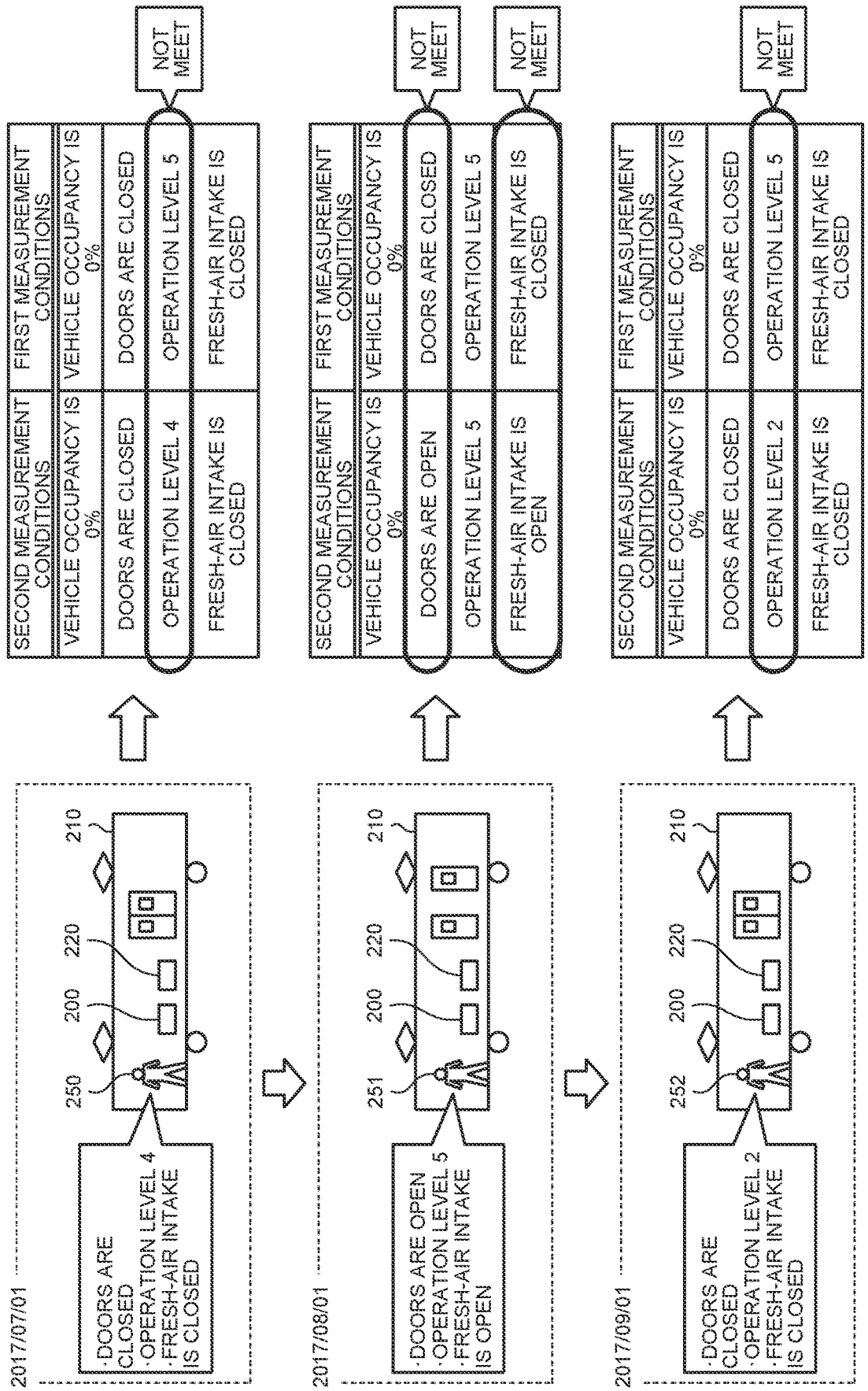
FIG. 2 is a diagram showing examples of operation states of an air conditioner, that is, measurement conditions, immediately after operation of a train is started in the deterioration diagnosis system according to the first embodiment.

Next, operation of the deterioration diagnosis system 300 will be described. Here, a case where the device installed on the train is an air conditioner will be specifically described as an example. When transmitting the operation data to the deterioration diagnosis apparatus 100, the on-board control apparatus 200 includes information on the second measurement condition together with the measurement result in the operation data. At this time, even during the same hours of the day, a train driver may differ from day to day. Therefore, the operation data transmitted to the deterioration diagnosis apparatus 100 by the on-board control apparatus 200 may have variations in measurement condition under which the state of the air conditioner is measured. FIG. 2 is a diagram showing examples of operation states of an air conditioner 220, that is, measurement conditions, immediately after operation of a train 210 is started in the deterioration diagnosis system 300 according to the first embodiment. Note that it is assumed that the operation mode of the air conditioner 220 is air cooling.

Assume that on Jul. 1, 2017 a driver 250 of the train 210 starts operation of the train 210 under the following second measurement conditions: the vehicle occupancy is 0%; doors of the train 210 are closed; an operation level of the air conditioner 220 is 4; and a fresh-air intake is closed, and measures the state of the air conditioner 220. The second measurement conditions and the first measurement conditions of the train 210 do not match in terms of the operation level in a case where the first measurement conditions stored in the measurement condition storage unit 105 of the deterioration diagnosis apparatus 100 are as follows: the vehicle occupancy is 0%; the doors are closed; an operation level is 5; and the fresh-air intake is closed. Note that the operation level with a larger numerical value is set to represent operation that consumes larger amount of energy.

Assume that on Aug. 1, 2017 that is the next month, another driver 251 of the train 210 starts operation of the train 210 under the following second measurement conditions: the vehicle occupancy is 0%; the doors of the train 210 are open; the operation level of the air conditioner 220 is 5; and the fresh-air intake is open, and measures the state of the air conditioner 220. In this case, the second measurement conditions and the first measurement conditions of the train 210 do not match in terms of the opening and closing of the doors and the opening and closing of the fresh-air intake.

Furthermore, assume that on Sep. 1, 2017 that is the month after that, still another driver 252 of the train 210 starts operation of the train 210 under the following second measurement conditions: the vehicle occupancy is 0%; the doors of the train 210 are closed; an operation level of the air conditioner 220 is 2; and the fresh-air intake is closed, and measures the state of the air conditioner 220. In this case, the second measurement conditions and the first measurement conditions of the train 210 do not match in terms of the operation level.

As described above, both the drivers and the second measurement conditions in the train 210 differ between the days on which data is acquired for diagnosing deterioration of the device, that is, the air conditioner 220. Since the second measurement conditions in the train 210 also differ between the days, data sets for the days are not allowed to be simply compared to each other. Therefore, in the present embodiment, when the second measurement conditions included in the operation data acquired from the on-board control apparatus 200 are different from the first measurement conditions stored in the measurement condition storage unit 105, the deterioration diagnosis apparatus 100 transmits, to the on-board control apparatus 200, a control command for changing a measurement condition corresponding to or having the difference. That is, the deterioration diagnosis apparatus 100 causes the on-board control apparatus 200 to measure the state of the device under the first measurement conditions.

Figure 3:
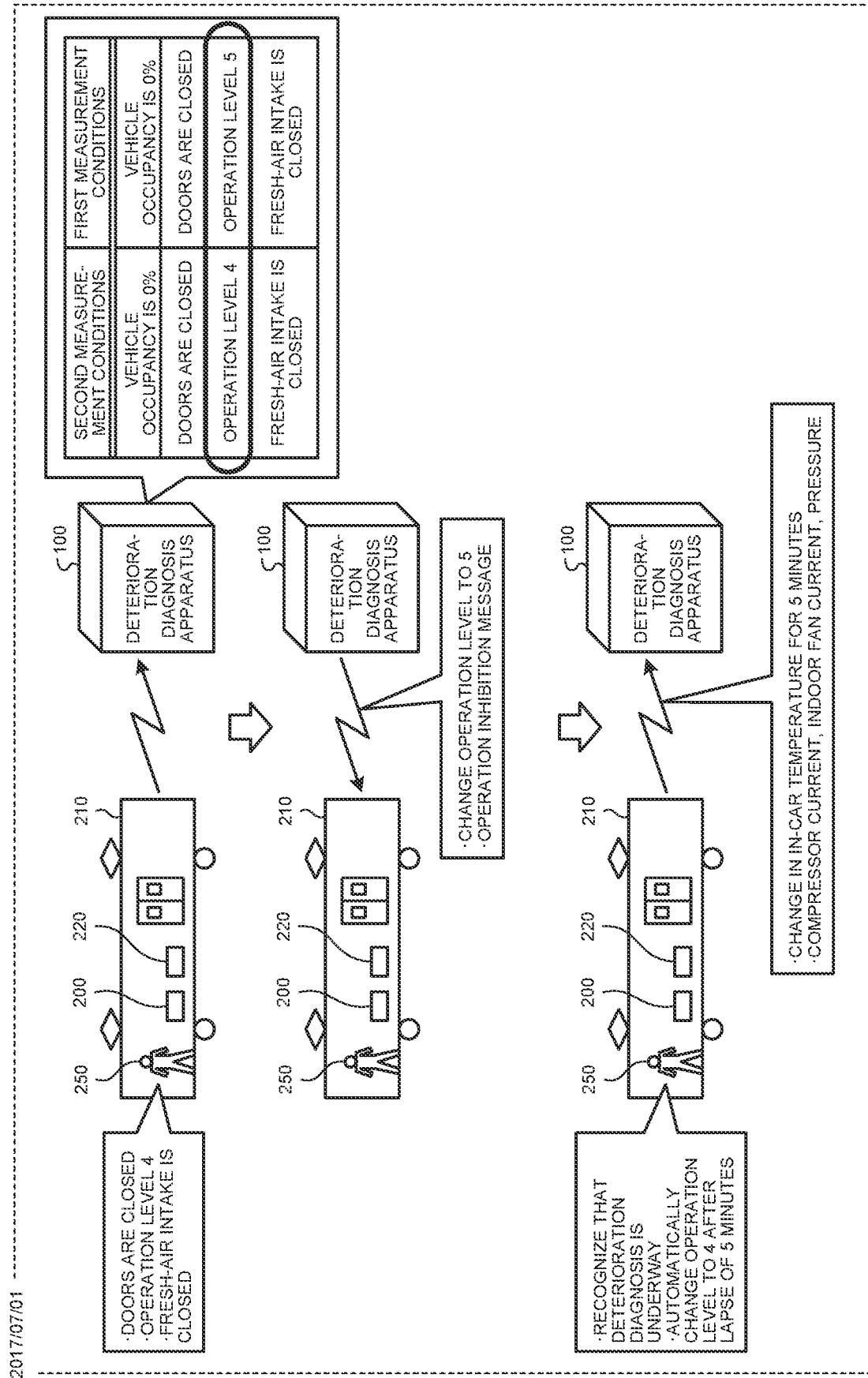
FIG. 3 is a diagram showing an example of operation in which a deterioration diagnosis apparatus causes an on-board control apparatus to change a second measurement condition in the deterioration diagnosis system according to the first embodiment.
Figure 4:
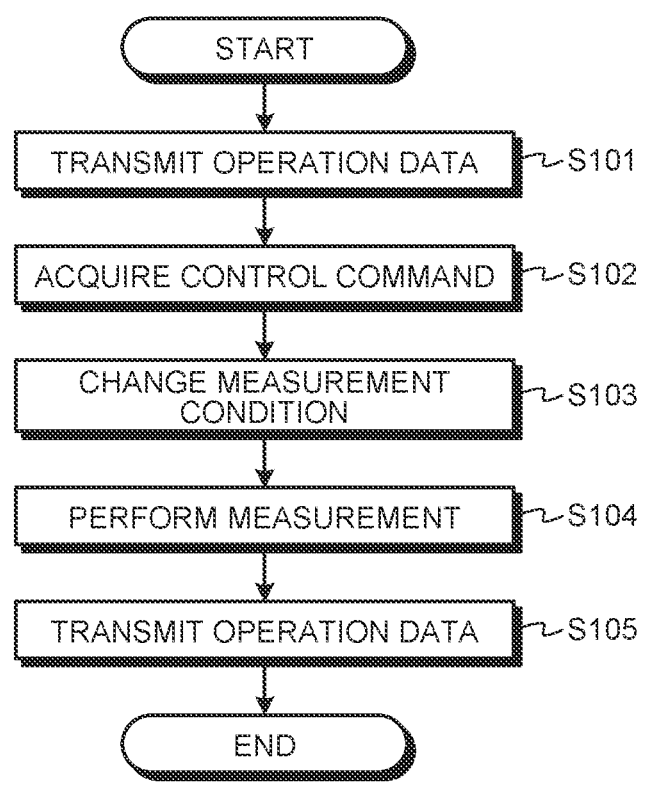
FIG. 4 is a flowchart illustrating an operation of the on-board control apparatus according to the first embodiment.
Figure 5:
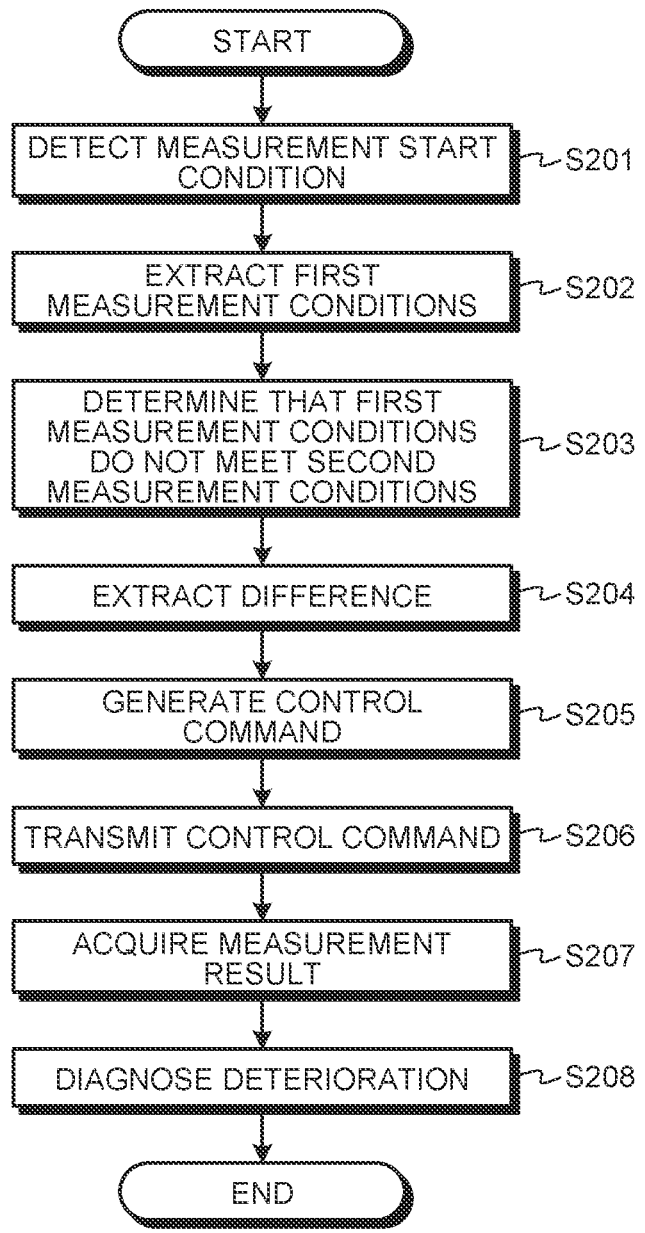
FIG. 5 is a flowchart illustrating an operation of the deterioration diagnosis apparatus according to the first embodiment.

FIG. 3 is a diagram showing an example of operation in which the deterioration diagnosis apparatus 100 causes the on-board control apparatus 200 to change a second measurement condition in the deterioration diagnosis system 300 according to the first embodiment. Although the flow of operation in the case of Jul. 1, 2017 illustrated in FIG. 2 will be described as an example in FIG. 3, substantially the same flow applies to the other cases, that is, a case of Aug. 1, 2017 and a case of Sep. 1, 2017. FIG. 4 is a flowchart illustrating an operation of the on-board control apparatus 200 according to the first embodiment. FIG. 5 is a flowchart illustrating an operation of the deterioration diagnosis apparatus 100 according to the first embodiment.

As illustrated in the flowchart of FIG. 4, in the on-board control apparatus 200, when operation of the train 210 is started, the control unit 201 generates operation data including, together with the information indicating that the power to the car has been turned on, the following second measurement conditions: the doors of the train 210 are closed; the operation level of the air conditioner 220 is 4; and the fresh-air intake is closed. The communication unit 202 transmits the operation data generated by the control unit 201 to the deterioration diagnosis apparatus 100 (step S101).

As illustrated in the flowchart of FIG. 5, in the deterioration diagnosis apparatus 100, the measurement start condition determination unit 103 detects a measurement start condition that the power to the car be turned on in the operation data acquired from the on-board control apparatus 200 (step S201).

The measurement condition extraction unit 106 extracts, from the measurement condition storage unit 105, a first measurement condition associated with the measurement start condition that the power to the car should be turned on. Specifically, the measurement condition extraction unit 106 extracts, as first measurement conditions under which the state of the air conditioner 220 is measured, the following measurement conditions from the measurement condition storage unit 105: the vehicle occupancy is 0%; the doors are closed; the operation level is 5; and the fresh-air intake is closed (step S202).

The measurement condition determination unit 107 determines whether or not the first measurement conditions extracted by the measurement condition extraction unit 106 meet the second measurement conditions included in the operation data. The measurement condition determination unit 107 determines that the first measurement conditions do not meet the second measurement conditions in terms of a measurement condition of the operation level (step S203).

The difference condition extraction unit 108 extracts a difference for the measurement conditions in terms of which the measurement condition determination unit 107 has determined that they do not meet (step S204). More specifically, in the situation where the operation level is 5 in the first measurement condition but the operation level is 4 in the second measurement condition, the difference condition extraction unit 108 extracts a difference "−1" in operation level.

The control command generation unit 109 generates a control command for eliminating the difference "−1" in operation level, that is, a control command for raising the operation level by one and changing the operation level to the operation level 5 (step S205). Note that the control command generation unit 109 may include an operation inhibition message for the driver 250 in the generated control command. The operation inhibition message is a message for prompting the driver 250 to refrain from performing an operation on the train 210 because measurement of data for deterioration diagnosis is underway.

The control command transmission unit 110 transmits, to the on-board control apparatus 200, the control command generated by the control command generation unit 109 (step 9206).

As illustrated in the flowchart of FIG. 4, in the on-board control apparatus 200, the communication unit 202 acquires the control command from the deterioration diagnosis apparatus 100 (step 3102). The communication unit 202 outputs the acquired control command to the control unit 201.

The control unit 201 changes the measurement condition based on the control command (step S103). More specifically, the control unit 201 changes the operation level of the air conditioner 220 from 4 to 5. After changing the operation level to 5, the control unit 201 measures, as the state of the air conditioner 220, a change in temperature in the car, a compressor electric current, an indoor fan electric current, a pressure, and/or the like (step S104). The control unit 201 periodically generates operation data including a measurement result for one or more measured items, and transmits the operation data to the deterioration diagnosis apparatus 100 via the communication unit 202 (step S105).

Note that after changing the operation level to 5, the control unit 201 may receive an operation of the driver 250 and thereupon perform an operation of changing the operation level to the original operation level 4, or may perform an operation of automatically changing the operation level to the original operation level 4 after a lapse of a prescribed time length, for example, 5 minutes. In the case where the operation level can be automatically changed to the original operation level, the control unit 201 can surely change the operation level to the original operation level 4 even if the driver 250 forgets to perform an operation of changing the operation level to the original operation level 4. In addition, in the case where the operation level can be automatically changed to the original operation level, the control unit 201 can surely change the operation level to the original operation level 4 even if the control unit cannot acquire a control command under the assumption that the operation level is changed to the original operation level based on a control command from the deterioration diagnosis apparatus 100.

As illustrated in the flowchart of FIG. 5, in the deterioration diagnosis apparatus 100, the measurement result acquisition unit 111 acquires, from the on-board control apparatus 200, a measurement result included in operation data generated after the on-board control apparatus 200 has changed the operation level to 5 (step S207).

The deterioration diagnosis unit 112 diagnoses deterioration of the air conditioner 220 with use of the measurement result acquired by the measurement result acquisition unit 111 (step S208).

Figure 6:
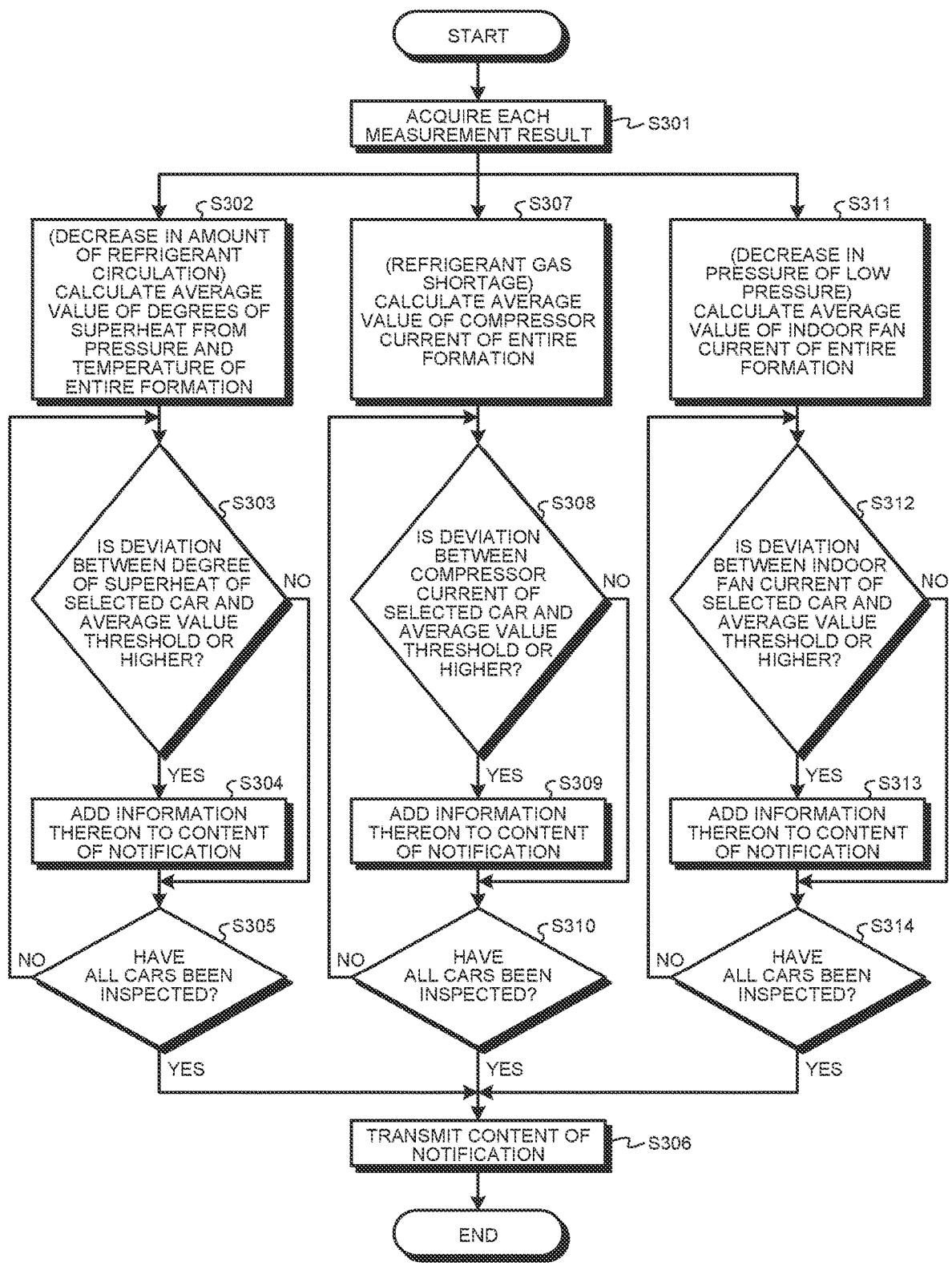
FIG. 6 is a flowchart illustrating an operation of deterioration diagnosis to be performed by a deterioration diagnosis unit according to the first embodiment.

FIG. 6 is a flowchart illustrating an operation of deterioration diagnosis to be performed by the deterioration diagnosis unit 112 according to the first embodiment. As described previously, description in this part is directed to an example of an operation in which the deterioration diagnosis unit 112 diagnoses deterioration of the air conditioner 220 of the train 210. The deterioration diagnosis unit 112 acquires a measurement result for each car or vehicle constituting the train 210 (step S301).

S [0046] The deterioration diagnosis unit 112 first makes a diagnosis regarding a decrease in the amount of refrigerant circulation of the air conditioner 220. More specifically, an average value of the degrees of superheat is calculated from the pressure and temperature of the entire formation of the train 210 (step 3302). When a deviation of the degree of superheat of a selected car from the average value is equal to or higher than a predetermined threshold (step S303: Yes), the deterioration diagnosis unit 112 adds information on the degree of superheat of the relevant car to the contents of a notification (step S304). When the deviation of the degree of superheat of the selected car from the average value is lower than the threshold (step S303: No), the deterioration diagnosis unit 112 omits the operation of step S304. When not all the cars have been inspected (step S305: No), the deterioration diagnosis unit 112 selects a car yet to be selected, and returns to step S303. When all the cars have been inspected (step B305: Yes), the deterioration diagnosis unit 112 transmits the contents of a notification to the on-board control apparatus 200, a rail yard (not illustrated), and the like (step S306).

Next, the deterioration diagnosis unit 112 makes a diagnosis regarding refrigerant gas shortage of the air conditioner 220. Specifically, the deterioration diagnosis unit 112 calculates the average value of compressor electric currents of the entire formation of the train 210 (step S307). When a deviation of the compressor electric current of the selected car from the average value is equal to or higher than a predetermined threshold (step S308: Yes), the deterioration diagnosis unit 112 adds information on the compressor electric current of the relevant car to the contents of a notification (step S309. When the deviation of the compressor electric current of the selected car from the average value is lower than the threshold (step S308, No), the deterioration diagnosis unit 112 omits the operation of step S309. When not all the cars have been inspected (step S310: No), the deterioration diagnosis unit 112 selects a car yet to be selected, and returns to step S308 when all the cars have been inspected (step S310: Yes), the deterioration diagnosis unit 112 transmits the contents of a notification to the on-board control apparatus 200, the rail yard (not illustrated), and the like (step S306).

Next, the deterioration diagnosis unit 112 makes a diagnosis regarding a decrease in low pressure of the air conditioner 220. Specifically, the deterioration diagnosis unit 112 calculates an average value of indoor fan electric currents of the entire formation of the train 210 (step S311). When a deviation of the indoor fan electric current of the selected car from the average value is equal to or higher than a predetermined threshold (step S312: Yes), the deterioration diagnosis unit 112 adds information on the indoor fan electric current of the relevant car to the contents of a notification (step S313). When the deviation of the indoor fan electric current of the selected car from the average value is lower than the threshold (step S312: NO), the deterioration diagnosis unit 112 omits the operation of step S313. When not all the cars have been inspected (step S314: No), the deterioration diagnosis unit 112 selects a car yet to be selected, and returns to step S312. When all the cars have been inspected (step S314: Yes), the deterioration diagnosis unit 112 transmits the contents of a notification to the on-board control apparatus 200, the rail yard (not illustrated), and the like (step S306).

Note that the deterioration diagnosis unit 112 may perform the operation of step S302 to step S305, the operation of step S307 to step S310, and the operation of step S311 to step S314 in sequence or in parallel. Furthermore, the present embodiment is directed to a diagnosis method in which the deterioration diagnosis unit 112 calculates the average values of certain device information such as the degree of superheat, the compressor electric current, and the indoor fan electric current for the entire formation of the train 210, and makes diagnoses based on determination as to whether or not a deviation of the certain device information on the selected car from the average value is equal to or higher than the predetermined threshold, but the present invention is not limited to this diagnosis method. The deterioration diagnosis unit 112 may perform deterioration diagnosis using single regression analysis, multiple regression analysis, or the like, on the basis of the measured device information and the past device information stored in a storage device (not illustrated). In addition, the deterioration diagnosis unit 112 may perform deterioration diagnosis based on comparison with device information on the same device installed on another train.

The user can judge whether or not there is a difficulty in operation of the train 210, necessity of detailed inspection, necessity of replacement of a device, or the like by checking the contents of a notification transmitted from the deterioration diagnosis apparatus 100 to the on-board control apparatus 200, the rail yard, or the like. Note that the thresholds to be used in steps S303, S308, and S312 are predetermined by the user.

The case where the deterioration diagnosis apparatus 100 is installed on the ground has been described in the present embodiment, but the present invention is not limited to this manner. The deterioration diagnosis apparatus 100 may be installed on the train 210. In addition, some components of the deterioration diagnosis apparatus 100 may be installed on the train 210, and the other components thereof may be installed on the ground. For example, the measurement result acquisition unit 111 and the deterioration diagnosis unit 112 of the deterioration diagnosis apparatus 100 may be installed on the ground, and the other components of the same may be installed on the train 210.

Next, a hardware configuration of the deterioration diagnosis apparatus 100 will be described. In the deterioration diagnosis apparatus 100, the measurement start condition defining unit 101 and the measurement condition defining unit 104 correspond to interfaces such as a keyboard and a mouse capable of receiving an operation from a user. The measurement start condition storage unit 102 and the measurement condition storage unit 105 correspond to memories. The control command transmission unit 110 and the measurement result acquisition unit 111 correspond to communication devices capable of communicating with the on-board control apparatus 200. The measurement start condition determination unit 103, the measurement condition extraction unit 106, the measurement condition determination unit 107, the difference condition extraction unit 108, the control command generation unit 109, and the deterioration diagnosis unit 112 are implemented by a processing circuit. The processing circuit may be a memory and a processor that executes a program stored in the memory, or may be dedicated hardware.

Figure 7:
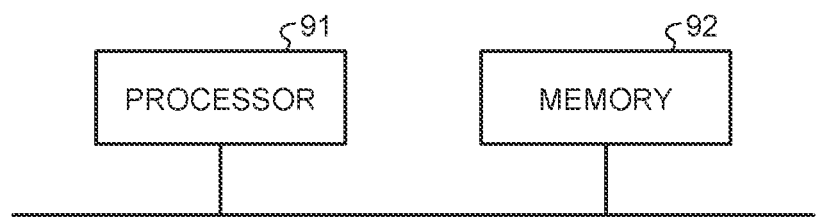
FIG. 7 is a diagram showing an example in which a processing circuit included in the deterioration diagnosis apparatus according to the first embodiment is constructed of a processor and a memory.

FIG. 7 is a diagram showing an example in which the processing circuit included in the deterioration diagnosis apparatus 100 according to the first embodiment is constructed of a processor and a memory. In a case where the processing circuit is constructed of a processor 91 and a memory 92, each function of the processing circuit of the deterioration diagnosis apparatus 100 is implemented by software, firmware, or a combination of software and firmware. The software or firmware is described as a program, and stored in the memory 92. The processor 91 reads and executes the program stored in the memory 92 to implement each of the functions in the processing circuit. That is, the processing circuit has the memory 92 for storing programs therein, the program being configured to execute processing for the deterioration diagnosis apparatus 100. In addition, it can also be said that these programs cause a computer to execute a procedure and a method for the deterioration diagnosis apparatus 100.

Here, the processor 91 may be a central processing unit (CPU), a processing device, an arithmetic device, a microprocessor, a microcomputer, a digital signal processor (DSP), or the like. Furthermore, what is applicable to the memory 92 is for example, a nonvolatile or volatile semiconductor memory such as a random access memory (RAM), a read only memory (ROM), a flash memory, an erasable programmable ROM (EPROM), or an electrically EPROM (EEPROM) (registered trademark); a magnetic disk; a flexible disk; an optical disk; a compact disk; a mini disk; or a digital versatile disc (DVD).

Figure 8:
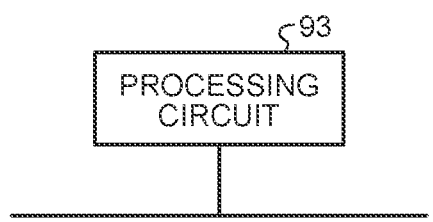
FIG. 8 is a diagram showing an example in which the processing circuit included in the deterioration diagnosis apparatus according to the first embodiment is constructed of dedicated hardware.

FIG. 8 is a diagram showing an example in which the processing circuit included in the deterioration diagnosis apparatus 100 according to the first embodiment is constructed by using dedicated hardware. In a case where the processing circuit is constructed by using dedicated hardware, what is applicable to a processing circuit 93 illustrated in FIG. 8 is for example, a single circuit, a composite circuit, a programmed processor, a parallel-programmed processor, an application specific integrated circuit (ASIC), a field programmable gate array (FPGA), or any combination thereof. Each of the functions of the deterioration diagnosis apparatus 100 may be implemented by the corresponding processing circuit 93 function by function, or all the function may be collectively implemented by one and the same processing circuit 93.

Note that some of the functions of the deterioration diagnosis apparatus 100 may be implemented by dedicated hardware, and some or all of the other functions thereof may be implemented by software or firmware. Thus, the processing circuit is capable of implementing each of the above-described functions by means of dedicated hardware, software, firmware, or any combination thereof.

A hardware configuration of the on-board control apparatus 200 will be described. In the on-board control apparatus 200, the communication unit 202 is a communication device capable of communicating with the deterioration diagnosis apparatus 100. The control unit 201 is implemented by a processing circuit. As in the case of the deterioration diagnosis apparatus 100, the processing circuit may be configured with a memory and a processor that executes a program stored in the memory, or may be a dedicated hardware set.

As described above, according to the present embodiment, the deterioration diagnosis apparatus 100 acquires operation data including a measurement result indicating the state of a device from the on-board control apparatus 200, transmits a control command to the on-board control apparatus 200 when a second measurement condition under which the measurement result has been obtained is different from a first measurement condition prescribed in the deterioration diagnosis apparatus 100, and sets a measurement condition under which the state of the device is measured in the train 210 to the first measurement condition. The on-board control apparatus 200 measures the state of the device in an environment conforming to the prescribed first measurement conditions, and transmits operation data including the measurement result to the deterioration diagnosis apparatus 10D. In this way, the on-board control apparatus 200 controls operation of the device installed on the train 210 on the basis of the control command acquired from the deterioration diagnosis apparatus 100. As a result, when the train 210 is operated, the deterioration diagnosis apparatus 100 can acquire data indicating the states of the device under the same measurement conditions. The deterioration diagnosis apparatus 100 can perform deterioration diagnosis of the device by virtue of use of the measurement result measured in the environment conforming to the prescribed first measurement conditions. The deterioration diagnosis apparatus 100 can diagnose the degree of deterioration, the progress of deterioration, and the like of a target device by virtue of use of measurement results which have been made under the first measurement conditions, and acquired on different days.

Note that in the present embodiment, the air conditioner 220 has been described as an example of the device installed on the train 210, but the present invention is not limited to this example. Although there is a different case in terms of the first measurement conditions and the like, the present embodiment is applicable even to a case where the device installed on the train 210 is the above-described brake, VVVF, or the like.

Second Embodiment

In the first embodiment, when a second measurement condition under which the state of a device installed on the train 210 is measured is different from a first measurement condition prescribed in the deterioration diagnosis apparatus 100, the deterioration diagnosis apparatus 100 transmits, to the on-board control apparatus 200, a control command to change the measurement condition. In a second embodiment, a description will be given of a case where a deterioration diagnosis apparatus does not transmit a control command even if the second measurement condition is different from the first measurement condition.

Figure 9:
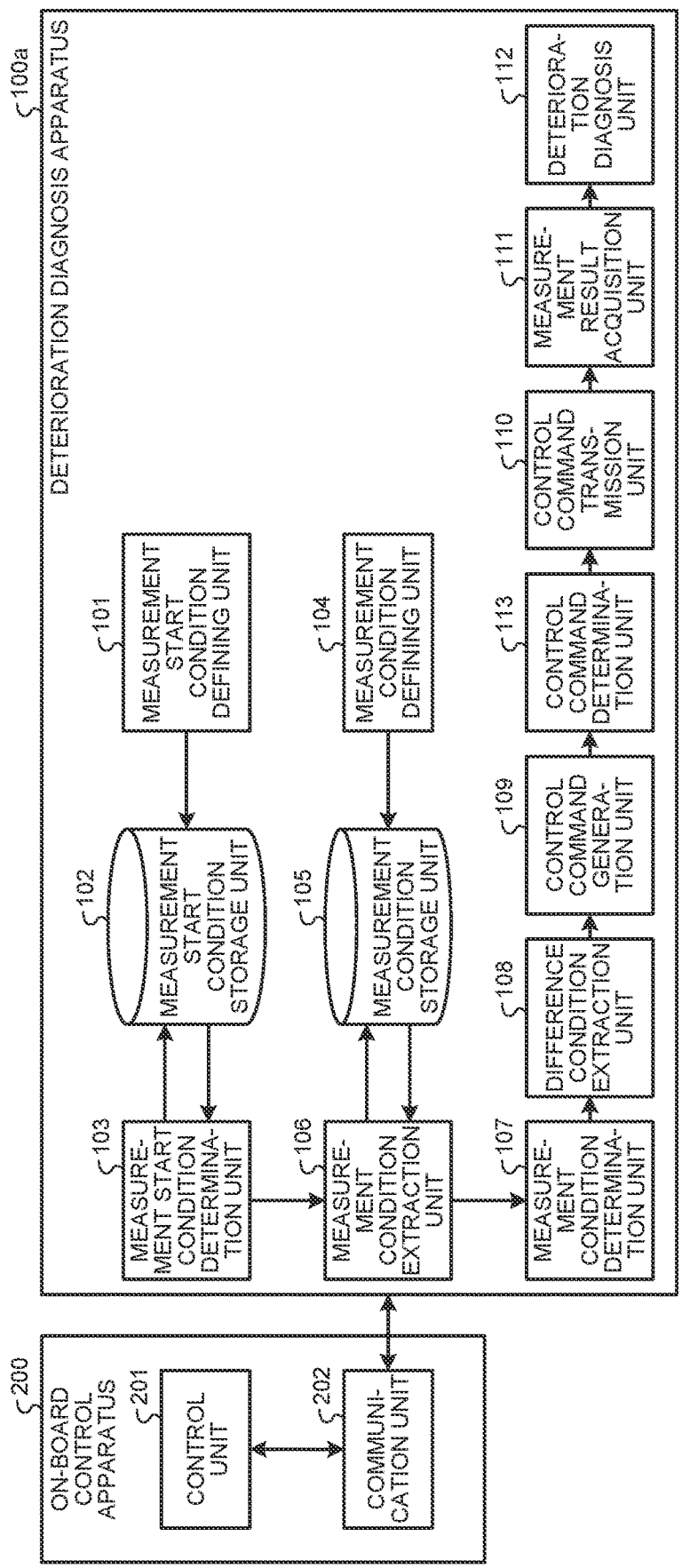
FIG. 9 is a block diagram showing a configuration example of a deterioration diagnosis system according to a second embodiment.

FIG. 9 is a block diagram showing a configuration example of a deterioration diagnosis system 300a according to the second embodiment. The deterioration diagnosis system 300a includes a deterioration diagnosis apparatus 100a and the on-board control apparatus 200. The deterioration diagnosis apparatus 100a is obtained by addition of a control command determination unit 113 to the deterioration diagnosis apparatus 100 of the first embodiment illustrated in FIG. 1a The control command determination unit 113 determines whether or not a control command generated by the control command generation unit 109 will cause no problem even if the control command is transmitted to the on-board control apparatus 200. A user specifies in advance information on a measurement condition to be used as a target for discarding a control command in the control command determination unit 113, and stores the information in the control command determination unit 113. That is, when the control command generated by the control command generation unit 109 has been set for eliminating a difference in terms of the specified measurement condition, the control command determination unit 113 discards the control command.

Figure 10:
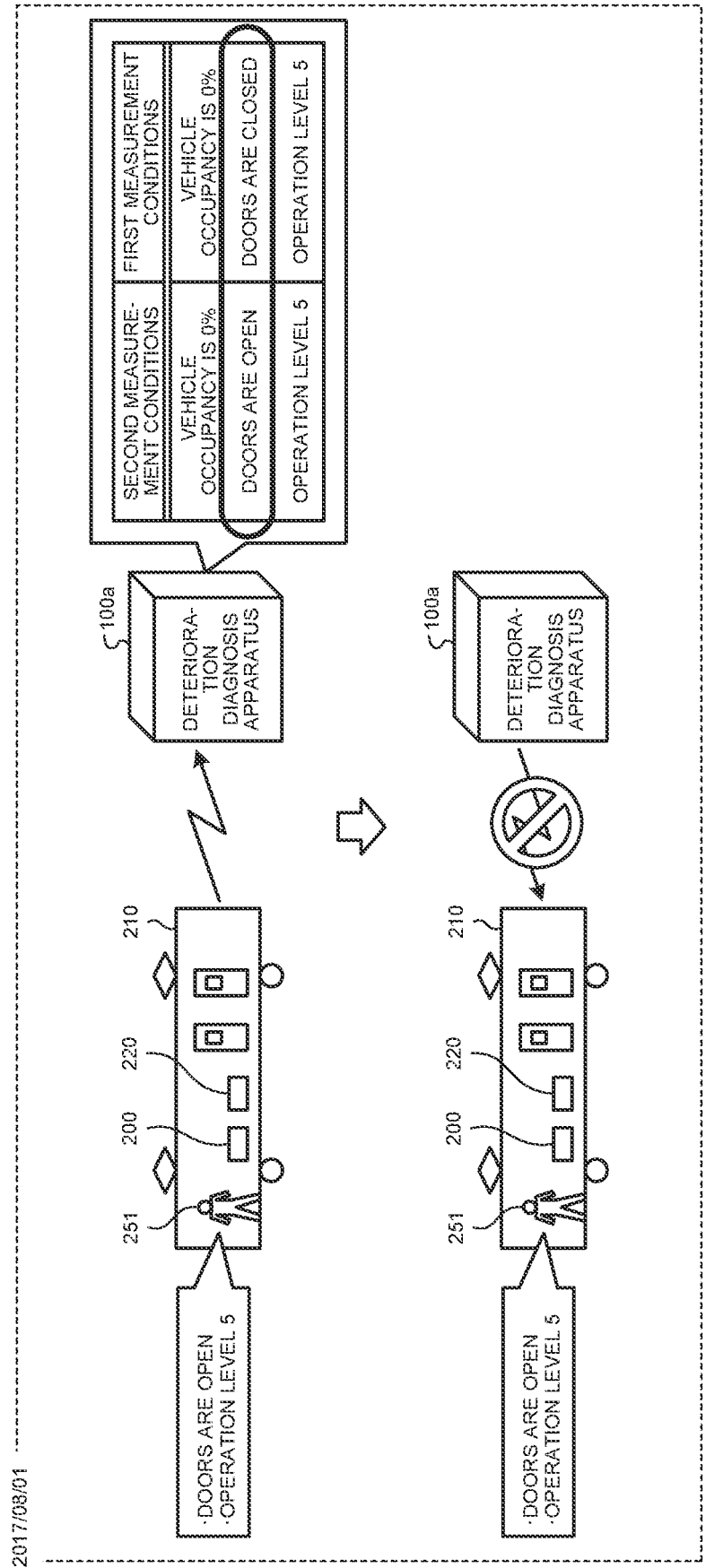
FIG. 10 is a diagram showing an example of an operation in which a deterioration diagnosis apparatus protects an on-board control apparatus from changing a second measurement condition in the deterioration diagnosis system according to the second embodiment.

FIG. 10 is a diagram showing an example of operation in which the deterioration diagnosis apparatus 100a protects the on-board control apparatus 200 from changing a second measurement condition in the deterioration diagnosis system 300a according to the second embodiment. As illustrated in FIG. 10, a first measurement condition specifies that doors are closed, whereas a second measurement condition specifies that the doors are open, and thus there is a difference in measurement condition. However, it is not desirable that an operation such as the opening or closing of the doors is changed before the operation is recognized by the driver 251 or a conductor (not illustrated) actually working on the train 210, that is, automatically changed by the control command from the deterioration diagnosis apparatus 100a. Therefore, in the second embodiment, the control command determination unit 113 checks the content of the control command generated by the control command generation unit 109, then causes the control command transmission unit 110 to transmit a control command for changing a measurement condition having no problem even if the condition is changed before the driver 251 or the conductor recognizes the change, but discards a control command for changing a measurement condition having undesirability if the condition is changed before the driver 251 or the conductor recognizes the change. The measurement condition having undesirability if the condition is changed before the driver 251 or the conductor recognizes the change corresponds to or means a measurement condition on a device that affects operation of the train 210, for example, a door, a device related to traveling or stopping of the train 210, or the like.

FIG. 11 is a flowchart illustrating an operation of the deterioration diagnosis apparatus 100a according to the second embodiment. In FIG. 11, the operation of step S201 to step S205 and the operation of step S206 to step S208 are the same as those in the flowchart of the first embodiment illustrated in FIG. 5. In the second embodiment, the control command determination unit 113 determines, after step S205, whether or not to transmit the control command generated by the control command generation unit 109 to the on-board control apparatus 200 (step 3209). When the control command determination unit 113 determines to transmit the control command generated by the control command generation unit 109 to the on-board control apparatus 200 (step S209: Yes), the deterioration diagnosis apparatus 100a proceeds to the operation of step S206. When the control command determination unit 113 determines not to transmit the control command generated by the control command generation unit 109 to the on-board control apparatus 200 (step S209: No), the deterioration diagnosis apparatus 100a terminates the operation.

Note that when a determination of "No" is made in step S209, the deterioration diagnosis apparatus 100a cannot acquire a result of measurement made under the first measurement conditions. In this case, the deterioration diagnosis apparatus 100a does not perform any operation of forcibly acquiring the measurement result, but retries the operation illustrated in FIG. 11 in the next chance such as the following day.

Regarding a hardware configuration of the deterioration diagnosis apparatus 100a, the control command determination unit 113 is implemented by a processing circuit. As in the case of the deterioration diagnosis apparatus 100, the processing circuit may be a memory and a processor that executes a program stored in the memory, or may be dedicated hardware.

As described above, according to the present embodiment, the deterioration diagnosis apparatus 100a does not transmit a control command to the on-board control apparatus 200 in the case where there is inconsistency between the first measurement conditions and the second measurement conditions, when a measurement condition having the inconsistency is a specified measurement condition. As a result, the deterioration diagnosis apparatus 100a can prevent a measurement condition from being changed, the measurement condition having undesirability if the condition is changed in contents of operation therefor without recognition of the driver 251 or the conductor in the train 210.

Note that the case where the deterioration diagnosis apparatus 100a does not transmit a control command depending on a measurement condition has been described in the present embodiment, but this is an example and the present invention is not limited thereto. For example, the deterioration diagnosis apparatus 100 of the first embodiment may transmit a control command, and the on-board control apparatus that has acquired the control command may have the same function as the control command determination unit 113 and discard the control command depending on a measurement condition. Also in this case, the deterioration diagnosis system can achieve the same effect as that in the case of the operation performed by the deterioration diagnosis apparatus 100a. Furthermore, the user may choose whether or not the on-board control apparatus should discard the control command.

The configurations set forth in the above embodiments show examples of the contents of the present invention, and can each be combined with other publicly known techniques and partially omitted and/or modified without departing from the scope of the present invention.

REFERENCE SIGNS LIST 100, 100a deterioration diagnosis apparatus; 101 measurement start condition defining unit; 102 measurement start condition storage unit; 103 measurement start condition determination unit; 104 measurement condition defining unit; 105 measurement condition storage unit; 106 measurement condition extraction unit; 107 measurement condition determination unit; 108 difference condition extraction unit; 109 control command generation unit; 110 control command transmission unit; 111 measurement result acquisition unit; 112 deterioration diagnosis unit; 113 control command determination unit; 200 on-board control apparatus; 201 control unit; 202 communication unit; 300, 300a deterioration diagnosis system.

The invention claimed is:

1. A deterioration diagnosis apparatus comprising:
a processing circuit having a processor and memory,
wherein the memory is configured to include a measurement condition storage unit of the memory in which first measurement conditions are stored, the first measurement conditions being operating conditions of at least one of one or more components and one or more systems of the train under which measurement is performed for diagnosing a state of a device installed on a train;
wherein the processor is configured to include:
a measurement condition determination unit to determine whether or not the first measurement conditions meet second measurement conditions in operation data that is acquired from the train by the processor and includes a measurement result indicating the state of the device installed on the train, the second measurement conditions being operating conditions of at least one of the one or more components and the one or more systems of the train under which the measurement result of the device has been obtained;
a difference condition extraction unit to extract a difference between the first measurement conditions and the second measurement conditions when the measurement condition determination unit determines that there is inconsistency between the first measurement conditions and the second measurement conditions;
a control command generation unit to generate a control command for automated adjustment of an operation level of the at least one of the one or more components and the one or more systems of the train to eliminate the difference in the first and second measurement conditions; and
the processing circuit being further configured to include a control command transmission unit to transmit the control command to the train.

2. The deterioration diagnosis apparatus according to claim 1, further comprising:
a measurement start condition storage unit in which measurement start conditions are stored, the measurement start conditions being operating conditions for starting the measurement for diagnosing the state of the device installed on the train, the measurement start conditions being associated with the first measurement conditions;
a measurement start condition determination unit to determine whether or not any of the measurement start conditions has been detected in the operation data that has been acquired from the train and includes the measurement result indicating the state of the device; and
a measurement condition extraction unit to extract any of the first measurement conditions from the measurement condition storage unit when any of the measurement start conditions has been detected in the measurement start condition determination unit, the extracted first measurement condition being associated with the detected measurement start condition.

3. The deterioration diagnosis apparatus according to claim 1, further comprising:
a deterioration diagnosis unit to make a diagnosis based on determination as to whether or not the device has deteriorated, with use of the measurement result included in the operation data when the second measurement conditions meet the first measurement conditions.

4. The deterioration diagnosis apparatus according to claim 1, further comprising:
a control command determination unit to discard the control command generated by the control command generation unit when the control command has been set for eliminating the difference in terms of a specified measurement condition.

5. A deterioration diagnosis system comprising:

the deterioration diagnosis apparatus according to claim 1; and an on-board control apparatus to control operation of a device installed on a train, on the basis of a control command acquired from the deterioration diagnosis apparatus.

6. A deterioration diagnosis method comprising:

a measurement condition determination step performed by a processing circuit for causing a measurement condition determination unit to determine whether or not first measurement conditions meet second measurement conditions in operation data that is acquired from a train by the processing circuit and includes a measurement result indicating the state of the device, the first measurement conditions being operating conditions of at least one of one or more components and one or more systems of the train under which measurement is performed for diagnosing a state of a device installed on the train, the second measurement conditions being operating conditions of at least one of the one or more components and the one or more systems of the train under which the measurement result of the device has been obtained;

a difference condition extraction step performed by the processing circuit for causing a difference condition extraction unit to extract a difference between the first measurement conditions and the second measurement conditions when the measurement condition determination unit determines that there is inconsistency between the first measurement conditions and the second measurement conditions;

a control command generation step performed by the processing circuit for causing a control command generation unit to generate a control command for automated adjustment of an operation level of the at least one of the one or more components and the one or more systems of the train to eliminate the difference in the first and second measurement conditions; and a control command transmission step performed by the processing circuit for causing a control command transmission unit to transmit the control command to the train.

7. The deterioration diagnosis method according to claim 6, further comprising:

a measurement start condition determination step of causing a measurement start condition determination unit to determine whether or not any of measurement start conditions has been detected in the operation data that has been acquired from the train and includes the measurement result indicating the state of the device, the measurement start conditions being operating conditions of at least one of the one or more components and the one or more systems of the train for starting the measurement for diagnosing the state of the device installed on the train; and a measurement condition extraction step of causing a measurement condition extraction unit to extract any of the first measurement conditions from a measurement condition storage unit in which the first measurement conditions associated with the measurement start conditions are stored, when any of the measurement start conditions has been detected in the measurement start condition determination unit, the extracted first measurement condition being associated with the detected measurement start condition.

8. The deterioration diagnosis method according to claim 6, further comprising:

a deterioration diagnosis step of causing a deterioration diagnosis unit to make a diagnosis based on determination as to whether or not the device has deteriorated, with use of the measurement result included in the operation data when the second measurement conditions meet the first measurement conditions.

9. The deterioration diagnosis method according to claim 6, further comprising:

a control command determination step of causing a control command determination unit to discard the control command generated by the control command generation unit when the control command has been set for eliminating the difference in terms of a specified measurement condition.

* * * * *